(12) United States Patent
Son (10) Patent No.: US 10,640,965 B2
(45) Date of Patent: May 5, 2020

(54) MANHOLE HAVING OIL-WATER SEPARATION FUNCTION

(71) Applicant: MIRAE INDUSTRIES CO., LTD, Seongju-gun (KR)

(72) Inventor: Myeong Suk Son, Seongju-gun (KR)

(*) Notice: Subject to any disclaimer, the term of this patent is extended or adjusted under 35 U.S.C. 154(b) by 0 days.

(21) Appl. No.: 16/086,599

(22) PCT Filed: May 4, 2017

(86) PCT No.: PCT/KR2017/004711
§ 371 (c)(1),
(2) Date: Sep. 19, 2018

(87) PCT Pub. No.: WO2017/213350
PCT Pub. Date: Dec. 14, 2017

(65) Prior Publication Data
US 2019/0100907 A1 Apr. 4, 2019

(30) Foreign Application Priority Data
Jun. 9, 2016 (KR) .................. 10-2016-0071509

(51) Int. Cl.
*E03F 5/16* (2006.01)
*E03F 5/14* (2006.01)
(Continued)

(52) U.S. Cl.
CPC .............. *E03F 5/14* (2013.01); *C02F 1/40* (2013.01); *E03F 5/02* (2013.01); *E03F 5/04* (2013.01); *E03F 5/16* (2013.01); *E02D 29/14* (2013.01)

(58) Field of Classification Search
CPC ...... E03F 5/15; E03F 5/16; E03F 5/14; B01D 17/0208; B01D 17/0214; C02F 1/40
(Continued)

(56) References Cited

U.S. PATENT DOCUMENTS 1,708,118 A * 4/1929 Carpenter ................. C02F 3/28
210/539
1,797,697 A * 3/1931 Rymal ...................... C02F 3/28
210/539
(Continued)

FOREIGN PATENT DOCUMENTS

CH 359101 * 1/1962
JP 2000-015002 A 1/2000
(Continued)

OTHER PUBLICATIONS

PCT international search report of PCT/KR2017/004711 dated Dec. 14, 2017.
PCT written opinion of PCT/KR2017/004711, dated Jul. 27, 2017.

*Primary Examiner* — Christopher Upton (57) ABSTRACT

The present invention relates to a manhole capable of an oil-water separation. An external air is introduced into a manhole through a inlet guide pipe and naturally and easily separate an oil-water mixture sewage into an oil sewage and the water sewage. The manhole may be installed in an area where the amount of the oil sewage and the water sewage is irregular, e.g., in an area single-family houses, multi-family houses, restaurants, roads, parking lots, gas stations are clustered. According to the present invention, an inlet guide pipe is provided in a manhole body and coupled to an inlet pipe. An oil-water mixture sewage flows in the manhole through the inlet guide pipe. The oil-water mixture sewage drops from the inlet guide pipe, causing turbulence or swirl. Due to the turbulence or swirl, the external air is also introduced through the inlet guide pipe and separates the oil-water mixture sewage into an oil sewage and a water sewage by a specific gravity difference. The oil sewage viscously agglomerates to form an oil lump. The cover (2) is opened to remove the oil lump from the manhole body (1).

1 Claim, 6 Drawing Sheets

(51) Int. Cl.
  *E03F 5/04* (2006.01)
  *C02F 1/40* (2006.01)
  *E03F 5/02* (2006.01)
  *E02D 29/14* (2006.01)

(58) Field of Classification Search
  USPC .................................. 210/519, 538, 539, 540
  See application file for complete search history.

(56) References Cited

U.S. PATENT DOCUMENTS

| | | | | |
|---|---|---|---|---|
| 2,285,893 A | * | 6/1942 | Boosey | B01D 17/0208 |
| | | | | 210/519 |
| 2,338,971 A | * | 1/1944 | Herman | C11B 13/00 |
| | | | | 210/539 |
| 2,433,087 A | * | 12/1947 | Boosey | B01D 17/0208 |
| | | | | 210/539 |
| 3,826,376 A | * | 7/1974 | Carlson | B01D 21/0003 |
| | | | | 210/519 |
| 3,957,656 A | * | 5/1976 | Castelli | B01D 17/0208 |
| | | | | 210/521 |
| 4,886,605 A | * | 12/1989 | Herve | E03F 11/00 |
| | | | | 210/539 |
| 6,126,817 A | * | 10/2000 | Duran | B01D 17/0214 |
| | | | | 210/539 |
| 2008/0237120 A1 | * | 10/2008 | Ismert | B01D 21/0003 |
| | | | | 210/519 |
| 2016/0340887 A1 | * | 11/2016 | Bailey | E03F 5/14 |

FOREIGN PATENT DOCUMENTS

| | | |
|---|---|---|
| KR | 10-0937580 B1 | 1/2010 |
| KR | 10-1270222 B1 | 6/2013 |
| KR | 10-2015-0091632 A | 8/2015 |
| KR | 10-2015-0093369 A | 8/2015 |

\* cited by examiner

MANHOLE HAVING OIL-WATER SEPARATION FUNCTION

CROSS REFERENCE

This application is a national stage application of PCT/KR2017/1004711 filed on May 4, 2017, which claims priority of Korean patent application number 10-2016-0071509 filed on Jun. 9, 2016. The disclosure thereof is incorporated herein by reference in its entirety.

TECHNICAL FIELD

The present invention relates to a manhole having a water separation function. By connecting the inlet pipe with the connection pipe at the bottom of the manhole cover, the outside air is introduced into the inside of the manhole body to efficiently separate the oil and water (sewage) from the sewage, and to conveniently collect the oil lump.

BACKGROUND ART

In industrial sites where waste oil and sewage are generated in large quantities and constantly, waste oil and sewage are separated from each other and then processed individually in various ways such as a specific gravity separation method, a hydraulic separation method, etc. depending on the amount of waste oil and sewage to be processed, the frequency of processing, and the type.

However, sewage generated in single-family houses, multi-family houses, roads, parking lots, gas stations, restaurants, etc. (oil and wastewater generated during cooking of various kinds of oil) is irregular in volume or too small to process using an industrial method. Thus, the oil and sewage flow into a manhole without being separated and discharged to the wastewater treatment plant together through the sewage pipe.

Due to its high viscosity, oil solidifies as a lump together with other materials to deposit an inner wall of the sewage pipe or the manhole. Thereby, a diameter of the pipe is gradually narrowed and clogged, causing a drainage issue. This results in complaints from residents and municipalities, and it costs a great deal of money to handle the issue.

When the solidified oil lumps are introduced into the wastewater treatment plant along with the wastewater, its high viscosity put a high load on the pump which transports the wastewater in the wastewater treatment plant. Thus, purification efficiency deteriorates when an oil sewage is mixed with a water sewage are processed together.

To solve this problem, an oil separation chamber is installed in the manhole to separate the oil sewage from the water sewage. The oil sewage is collected in an oil storage tank located at a bottom of the manhole and discharged, to the outside. The water sewage is discharged from the manhole to a sewer line. Alternatively, when the oil-water mixture sewage is introduced into the manhole, the oil-water mixture sewage is separated into the oil sewage and the water sewage by a specific gravity difference. The oil sewage has a lower specific gravity than the water and thus floats on the water sewage. The water sewage is then discharged to a discharge pipe, and the oil sewage is collected separately and removed using a central cleaning system.

However, the water-oil separation using a specific gravity difference is not effective when the mixture sewage temperature is hot. In a conventional structure or system, an external air is not provided into the hot sewage. Thus, the oil-water mixture sewage remains hot in the manhole. As a result, the separation efficiency is poor. For this reason, a natural separation method is not popular. Even if it is employed, its performance was bad.

DETAILED DESCRIPTION OF THE INVENTION

Problem to be Solved

To solve the above-mentioned conventional drawbacks, the present invention provides a manhole having an oil separation function. The manhole is proper for a residential or commercial area for single-family houses, multi-family houses, restaurants, roads, parking lots, gas stations, etc. where the amount of sewage including oil and water is irregular or too small to process it with an industrial system. The manhole according to an embodiment is structured such that an external air can be introduced into the manhole while the oil-water mixture sewage flows into the manhole. The external air enhances the oil-water separation efficiency and the oil sewage is removed conveniently. Specifically, when the oil-water mixture sewage flows into the manhole, the external air is also introduced into an inlet pipe of the manhole through a cover of the manhole. The oil sewage and the water sewage are naturally separated from each other by a specific gravity difference. Oil has a lower specific gravity than water and thus floats on water. The oil separated from water can be easily collected and removed.

Solution to Solve the Problem

Figure 1:
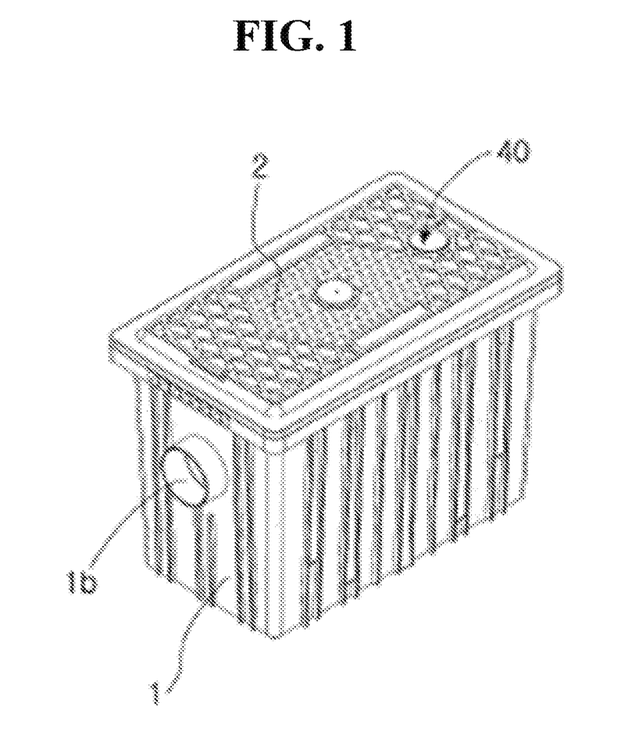
FIG. 1 is a perspective view of a manhole according to an embodiment of the present invention.
Figure 2:
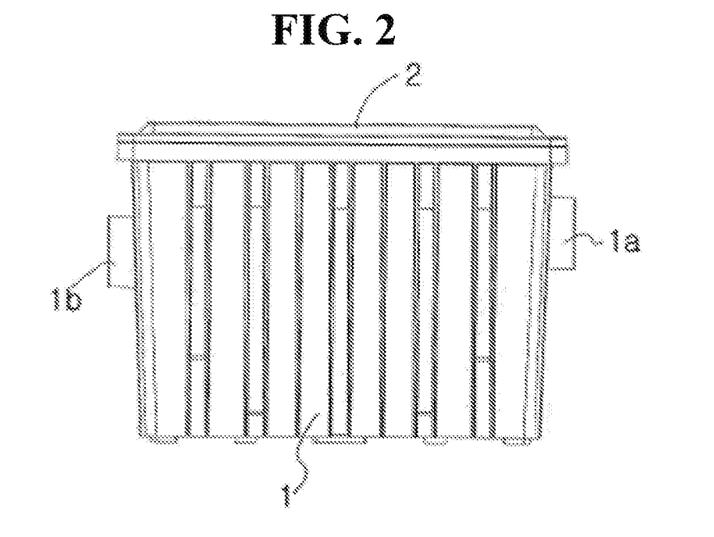
FIG. 2 is a front view of a manhole according to an embodiment of the present invention.
Figure 3:
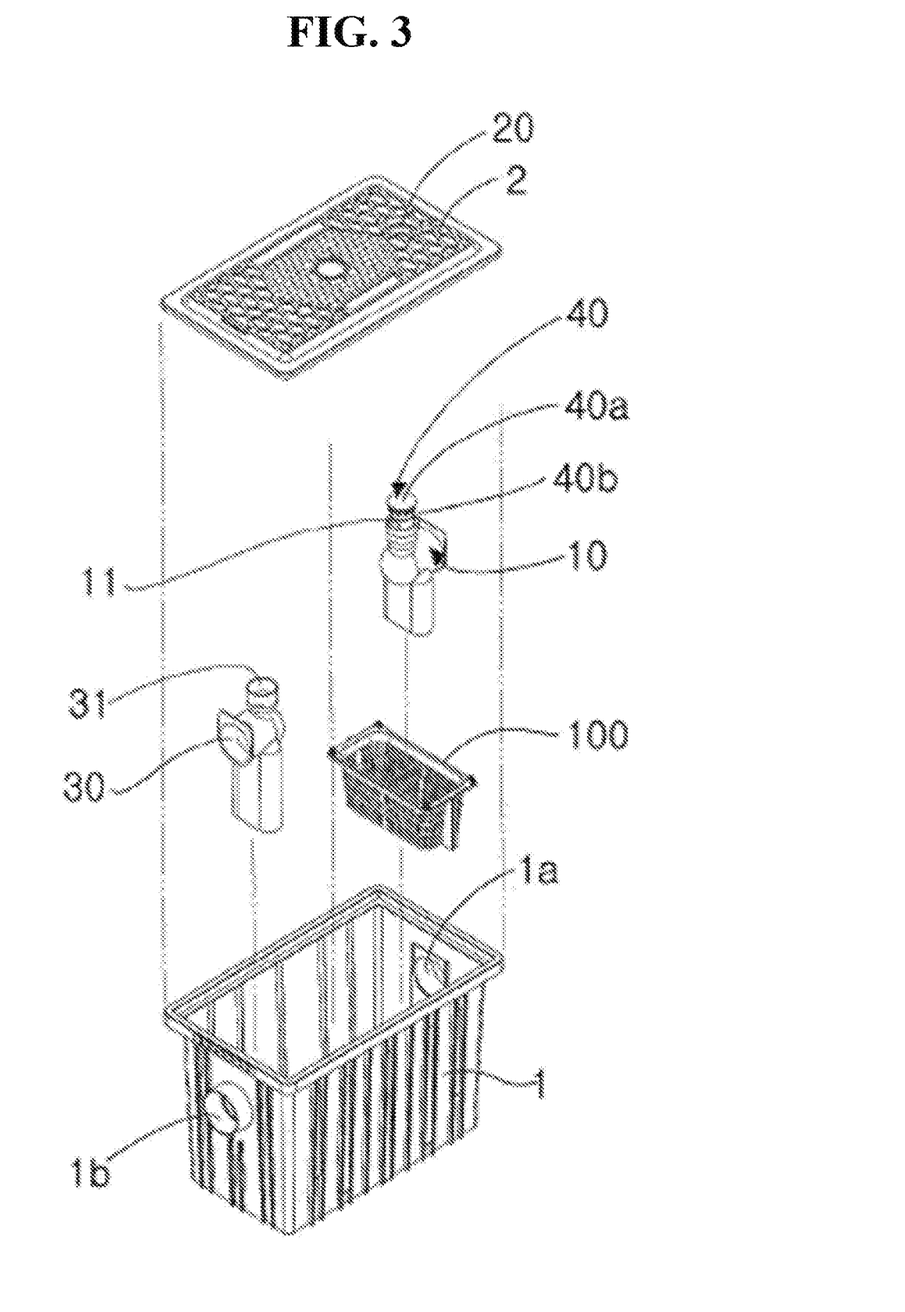
FIG. 3 is an exploded view of a manhole according to an embodiment of the present invention when viewed from a side where the discharge pipe is located.
Figure 4:
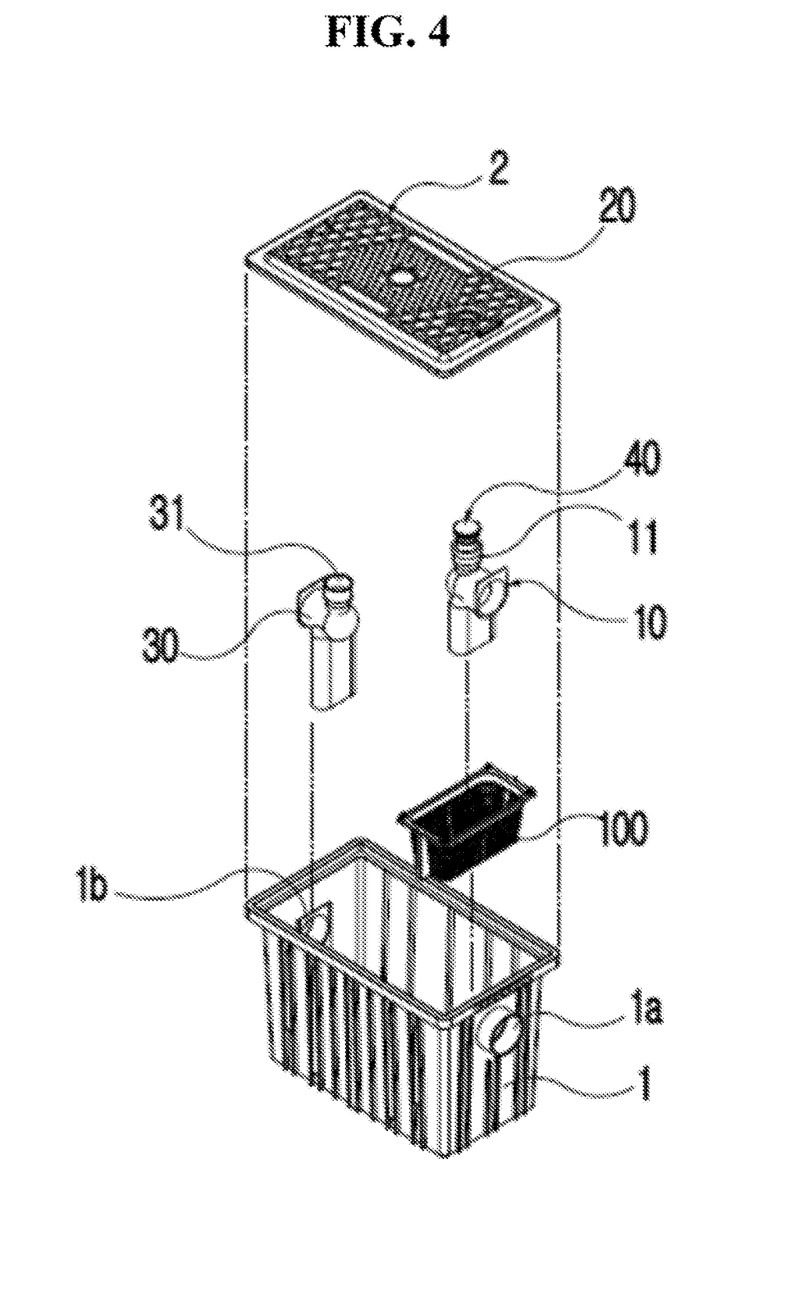
FIG. 4 is an exploded view of a manhole according to an embodiment of the present invention when viewed from a side where the inlet pipe is located.
Figure 5:
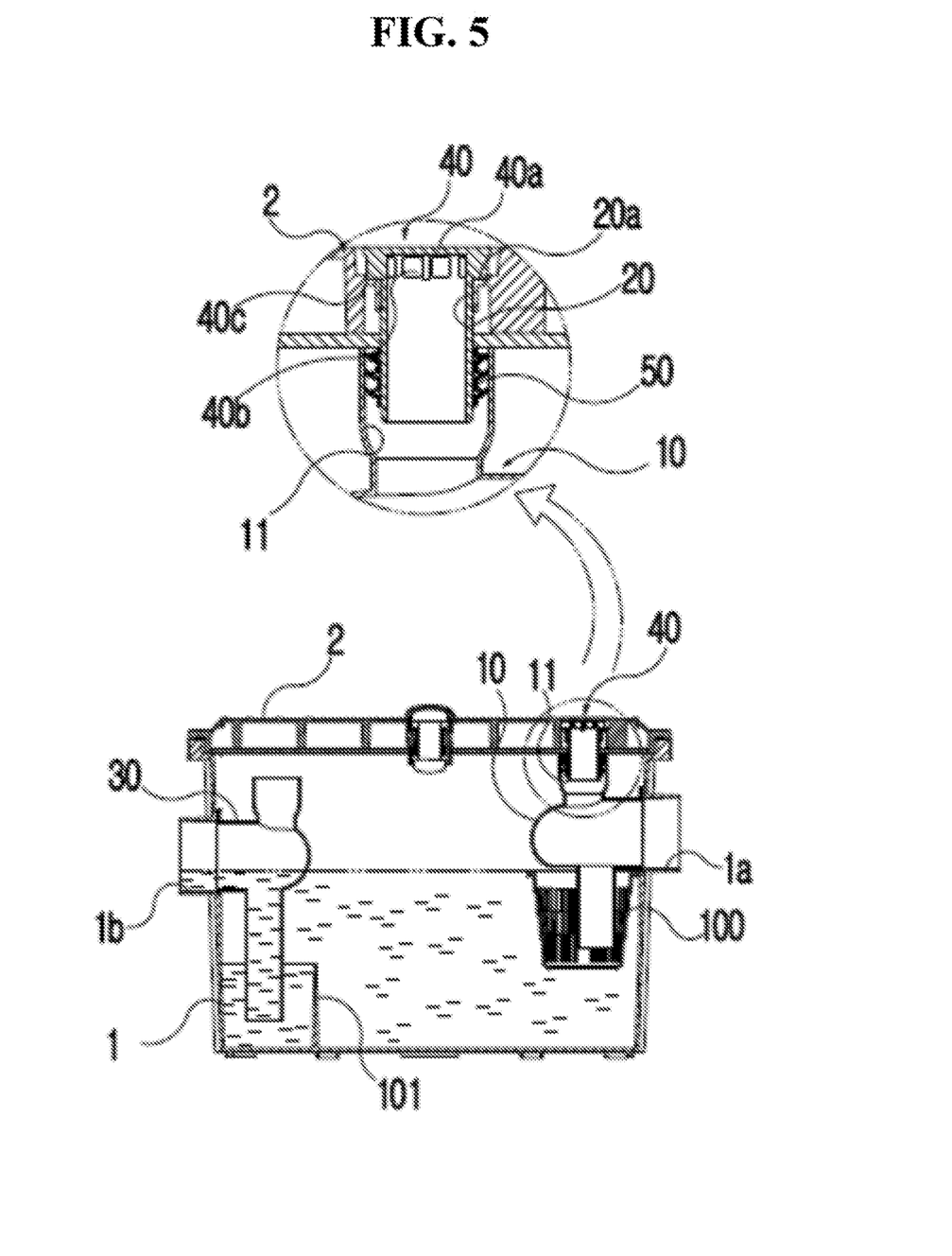
FIG. 5 is a sectional view of a manhole according to an embodiment of the present invention.

In the present invention, as shown in FIGS. 1 to 4, an inlet pipe (1a) is provided on a first sidewall of a manhole main body (1) having an open top, and a discharge pipe (1b) is provided on a second sidewall of the manhole main body (1). A discharge guide pipe (30) and a gas exhausting pipe (31) are connected to the inside of the discharge pipe (1b) and a lid (2) is provided over the open top of the manhole body (1). As shown in FIGS. 3 to 5, the inlet guide pipe (10) is coupled with the inlet pipe (1a) to naturally introduce an external air into the sewage flowing into the manhole, thereby facilitating the oil-water separation by a specific gravity difference.

As shown in FIGS. 3 to 5, a supporting pipe (11) is provided over the inlet guide pipe (10). The external air is provided into the inlet guide pipe (10) through the supporting pipe (11). A through hole (20) with a step (20a) is formed in the cover (2). The through hole (20) and the supporting pipe (11) are vertically aligned with each other. A connection pipe (40) is provided to couple the supporting pipe (11) to the through hole (20). A plug (40a) an air passage (40b), and shoulders (40c) are provided on the connection pipe (40). The plug (40a) covers the through hole (20).

In the drawings, the reference numeral 50 denotes a sealing packing, the reference numeral 100 denotes a filter, and the reference numeral 101 denotes a sediment barrier.

Advantages of the Invention

According to an embodiment of the present invention, the manhole may be installed to process a small or irregular amount of oil-water mixture sewage which is generated usually a residential or commercial areas such as single or multi-family houses, restaurants, roads, parking, lots, gas stations, etc. The manhole may be coupled with a sewer line in such area.

The oil-water mixed sewage is introduced into the main body of the manhole through the inlet pipe. At the same time, an external air flows into the inlet pipe through the air passage of the connection pipe connected to the cover. Under this structure, oil is easily separated from water by a specific gravity difference. Oil with a relatively low specific gravity floats on water and can be easily collected. Water is discharged to a sewer line through the discharge guide pipe. Gas generated as the sewage decays is also discharged through the discharge guide pipe. The oil floating on the water is corrected and then removed from the manhole.

SUMMARY OF INVENTION

Hereinafter, preferred embodiments of the present invention will be described in detail with reference to the accompanying drawings.

According to an embodiment of the present invention, as shown in FIGS. 1 to 4, a manhole capable of oil-water separation includes: a manhole body (1) with an open top; an inlet pipe (1a) formed on a first sidewall of the manhole body (1); a discharge pipe (1b) formed on a second sidewall of the manhole body (1); a discharge guide pipe (30) coupled to the discharge pipe (1b); a cover provided over the open top of the manhole body (1); and an inlet guide pipe (10) provided in manhole body (1) and coupled to the inlet pipe (1a). An oil-water mixture sewage flows into the manhole (1) through the inlet pipe (1a). An external air is introduced into the inlet guide pipe (10). The oil-water mixture sewage is separated into an oil sewage and a water sewage by the external air.

As shown in FIGS. 3 to 5, a supporting pipe (11) provided over the inlet guide pipe (10). The external air is introduced into the inlet guide pipe (10) through the supporting pipe (11). A through hole (20) is formed in the cover (2) and having a step (20a). The through hole (20) and the supporting pipe (11) are vertically aligned with each other. A connection pipe (40) is provided between the supporting pipe (11) and the through hole (20) and includes a plug (40a), an air passage (40b), and shoulders (40c). The plug (40a) covers the through hole (20) of the cover (2).

BEST MODE

As shown in FIGS. 3 to 5, the manhole main body (1), the lid (2), the inflow induction pipe (10), and the connection pipe (40) are made of a synthetic resin material and can be manufactured by a mass production, e.g., using an injection molding method.

The manhole of the present invention may be installed in an area where the amount of the oil sewage and the water sewage is irregular or too small to process it with an industrial system, e.g., in an area such as single-family houses, multi-family houses, restaurants, roads, parking lots, gas stations are clustered. The manhole enables an external air to be introduced into the inlet guide pipe. Upon introduction of the external air, oils and waters of the sewage can be easily separated from each other by a specific gravity difference. The separated oil lumps are be easily collected during the cleaning process.

For example, a domestic sewage such as oils which is generated during a cooking in a household may inflow into the manhole body (1) through the inlet pipe (1a).

Figure 6:
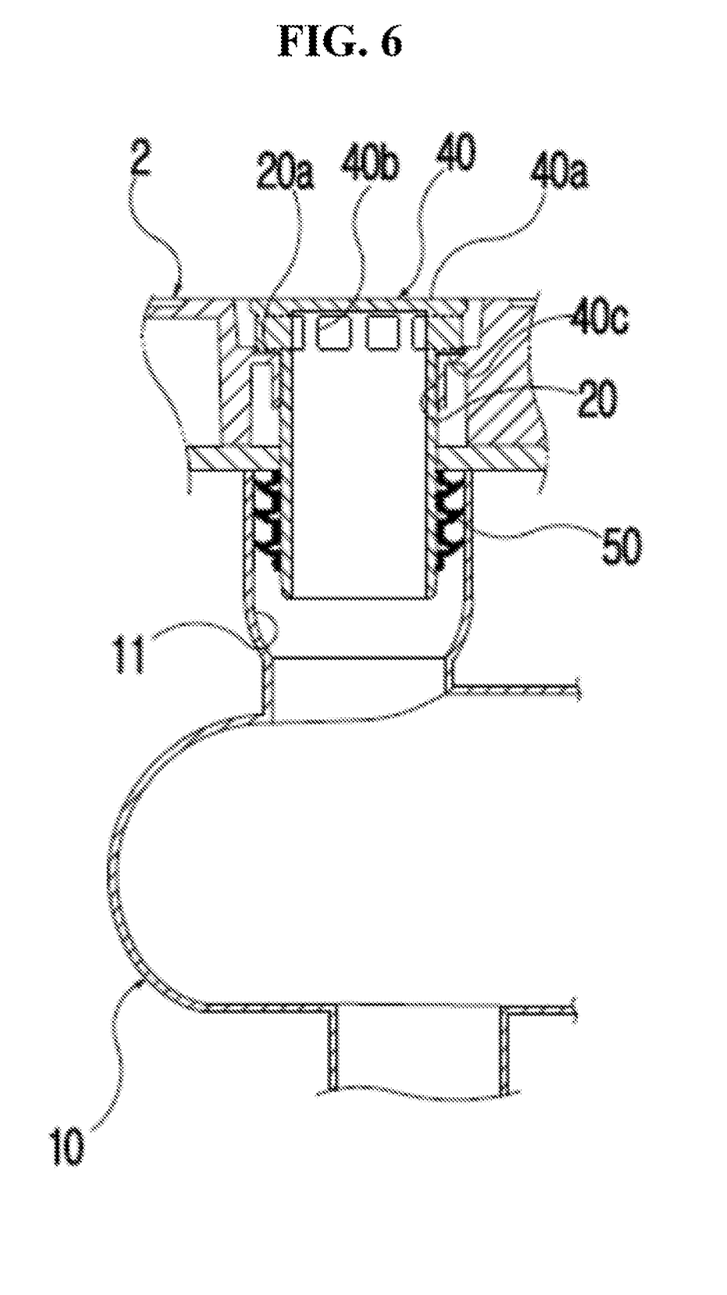
FIG. 6 is a cross-sectional view showing that an external air is introduced into the inlet guide pipe through the connection pipe.
Figure 7:
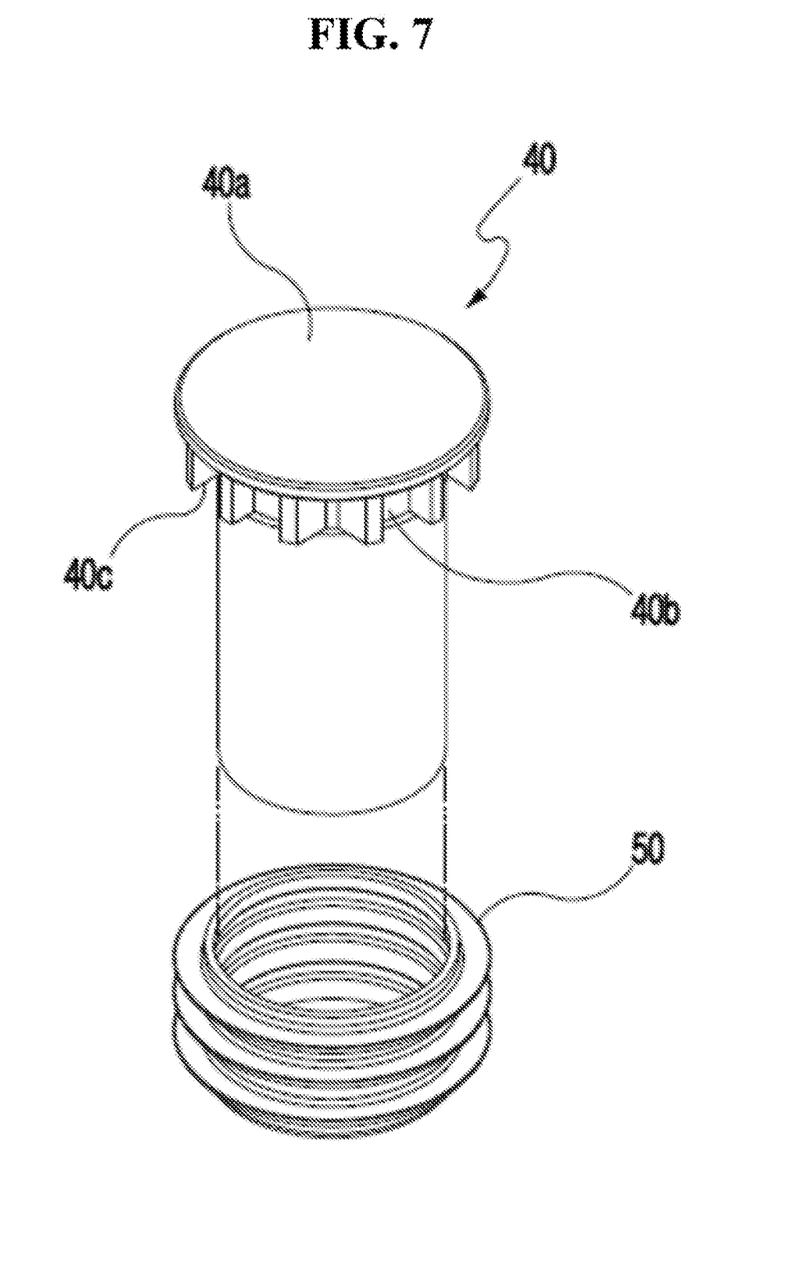
FIG. 7 is a perspective view shoving the connection pipe and the sealing packing according to an embodiment of the present invention.

As shown in FIGS. 5 and 6, an oil-water mixture sewage is introduced into the manhole body (1) through the inlet pipe (1a). The oil-water mixture sewage is dropped from the inlet guide pipe (10), causing turbulence or swirl. Due to the turbulence or swirl, the external air is also introduced in the manhole body through the air passage (40b) and the connection pipe (40). The connection pipe (40) is coupled to the cover (2).

A solid waste, which is introduced along with the oils, the water sewage, or the external air, is filtered by a filter (100). The oil and the water sewage are efficiently separated from each other by a specific gravity difference. The oil sewage has a lower specific gravity than the water sewage. Thus, in the manhole body (1), the oil sewage floats on the water sewage.

When a water sewage level rises and reaches at a certain level of the manhole body 1, the water sewage is discharged through the discharge pipe (1b).

Specifically, when the water sewage level becomes higher than a level where the discharge pipe (1b) is located, the water sewage is discharged to a sewage pipe via the discharge guide pipe (30) and the discharge pipe (1b) coupled to the manhole body (1).

As such, when a domestic sewage, i.e., the oil-water mixture sewage, flows into the manhole body (1), an external air also flows in as well. The air facilitates oil-water separation by a specific gravity difference. Odor and gas generated by a decay of the sewage are discharged or exhausted through a gas exhausting pipe (31). The gas exhausting pipe (31) is coupled to the discharge guide pipe (30).

The manhole according to an embodiment of the present invention may be installed in an area where the amount of the oil sewage and the water sewage is irregular, e.g., in an area single-family houses, multi-family houses, restaurants, roads, parking lots, gas stations are clustered. As shown in FIG. 6, when the oil-water mixture sewage flows into the inlet guide pipe (10) of the inlet pipe (1a) of the manhole body (1), turbulence or swirl occurs. The turbulence or swirl facilitate the external air to be introduced from the outside the cover (2) into the manhole body (1) through the air passage (40b) of the connection, pipe (40). The oil-water mixture sewage cools down by the external air, and the oil-water mixture sewage cooled down by the external air is naturally and efficiently separated into the oil sewage and the rater sewage by a specific gravity difference.

In an embodiment, the shoulder (40c) is formed in the connection pipe (40) and located under the plug (40a). The step (20a) is coupled with the through hole (20) of the lid (2). The shoulder (40c) is stuck on the step (20a). A gap is formed between an inner wall of the through hole (20) and an outer wall the connection pipe (40). The external air is introduced into the inlet guide pipe (10) of the manhole body (1) through the gap and the shoulder (40c). The present invention is not limited to this embodiment.

As shown in FIG. 5, the connection pipe (40) is coupled to the cover (2). The inlet guide pipe (10) is provided inside the manhole body (1) and coupled to the inlet pipe (1a). The supporting pipe (11) is connected to an upper portion of the inlet guide pipe (10). A sealing packing (50) is provided between the connection pipe (40) and the supporting pipe (11) to prevent leakage and prevent a malodor from flowing back to the connection pipe (40).

As the above-mentioned process repeats, the oil sewage floating on the water sewage viscously agglomerates to form a oil lump. The cover (2) is opened and the oil lump is removed from the manhole body (1).

As described above, the manhole according to an embodiment of the present invention facilitates an external air to be introduced into the inlet guide pipe (10) and naturally separate the oil sewage and the water sewage by a specific gravity difference. The water sewage is discharged to outside through the discharge guide pipe (30). The gas and order generated in the manhole body (1) by a decay of the sewage are also discharged to outside. The oil sewage agglomerates to form the oil lump. The cover (2) is opened and the oil lump is removed from the manhole body (1).

REFERENCE NUMERALS

1: Manhole body
1a: Inlet pipe
1b: Discharge pipe
2: Cover
10: Inlet guide pipe
11: Support tube
20: Through hole
20a: Step
40c: Shoulder
30: Discharge guide pipe
31: Gas exhausting pipe
40: Connection pipe
40a: Plug
40b: Air passage

What is claimed is:
1. A manhole comprising:
a manhole body (1) with an open top;
an inlet pipe (1a) formed on a first sidewall of the manhole body (1);
a discharge pipe (1b) formed on a second sidewall of the manhole body (1);
a discharge guide pipe (30) coupled to the discharge pipe (1b);
a cover (2) provided over the open top of the manhole body (1);
an inlet guide pipe (10) provided in the manhole body (1) and coupled to the inlet pipe (1a), wherein an oil-water mixture sewage flows in the manhole (1) through the inlet pipe (1a), wherein an external air is introduced into the inlet guide pipe (10), wherein the external air facilitates the oil-water mixture sewage to be separated into an oil sewage and a water sewage by a specific gravity difference;
a supporting pipe (11) provided between the inlet guide pipe (10) and the cover (2), wherein the external air is introduced into the inlet guide pipe (10) through the supporting pipe (11);
a through hole (20) formed in the cover (2) and extending into the supporting pipe (11); and
a connection pipe (40) coupled with the cover (2) and fitting in the through hole (20), wherein the connection pipe (40) includes a plug (40a), an air passage (40b), and a shoulder (40c),
wherein an upper portion of the plug (40a) is provided over the through hole (20) and covers the through hole (20),
wherein a lower portion of the plug (40a) is indented toward the through hole (20) to form the shoulder (40c) and has a narrower width than the upper portion of the plug (40a) to fit in the through hole (20),
wherein a step (20a) extends from the cover (2) to under the upper portion of the plug (40a) so that the connection pipe (40) is coupled with the cover (2),
wherein the air passage (40b) is provided through the upper portion of the plug (40a), is open to outside, and communicates with the through hole (20),
wherein the through hole (20) communicates with the supporting pipe (11),
wherein the supporting pipe (11) communicates with the inlet guide pipe (10),
wherein the external air is introduced from the outside into the inlet guide pipe (10) through the air passage (40b), the through hole (20), and the supporting pipe (11).

\* \* \* \* \*